Oct. 17, 1933.  P. P. FEIT  1,931,143

LATHE ATTACHMENT

Filed May 27, 1932  2 Sheets-Sheet 1

Inventor

Paul P. Feit

By Frease and Bishop
Attorneys

Oct. 17, 1933.   P. P. FEIT   1,931,143
LATHE ATTACHMENT
Filed May 27, 1932   2 Sheets-Sheet 2

Inventor
Paul P. Feit
By Frease and Bishop Attorneys

Patented Oct. 17, 1933

1,931,143

UNITED STATES PATENT OFFICE 1,931,143

LATHE ATTACHMENT

Paul P. Feit, Canton, Ohio

Application May 27, 1932. Serial No. 613,829

11 Claims. (Cl. 82—12)

The invention relates to lathe attachments which may be easily mounted upon the tool holder carriage in place of the usual tool holder compound, and more particularly to lathe attachments adapted for making arcuate cuts upon work in the lathe.

In the past, in making an arcuate cut with the ordinary lathe, it has been the common practice for the operator to simultaneously operate the feeding means for moving the carriage longitudinally of the lathe, and the carriage cross feed, so as to move the tool holder in a curvilinear path roughly approximating the desired arcuate cut. Obviously, this method is unsatisfactory, because the accuracy of the arcuate cut depends upon the skill of the operator, and the cut is never perfectly true even with the most skillful operator.

Accordingly, it is an object of the present invention to provide a lathe attachment which may be easily substituted for the ordinary tool holder compound, and which is capable of making accurate arcuate cuts in addition to performing all of the functions of the compound.

Another object is to provide a lathe attachment which is easily adjusted for making arcuate cuts of different radii.

A further object is to provide means indicating, at all times, what proportion of its complete circular path has been traversed by the cutting tool.

And finally, it is an object of the present invention to incorporate all of the foregoing advantageous features in a simple, compact and inexpensive attachment which may be easily substituted for the usual compound on an ordinary lathe, and which requires practically no additional space.

These and other objects are attained by the improvements comprising the present invention, which may be stated in general terms as including a lower plate adapted to be secured on the carriage cross feed plate, an intermediate cross feed plate slidable longitudinally on said lower plate, means for moving said intermediate plate longitudinally on the lower plate, a top tool holder plate carried by the intermediate plate, means for moving the top plate in a horizontal circular path relative to the intermediate plate, means for varying the radius of the circular path, and means for indicating the proportion of the path which has been traversed at any time.

Referring to the drawings forming part hereof

Similar numerals refer to similar parts throughout the drawings.

Figure 1:
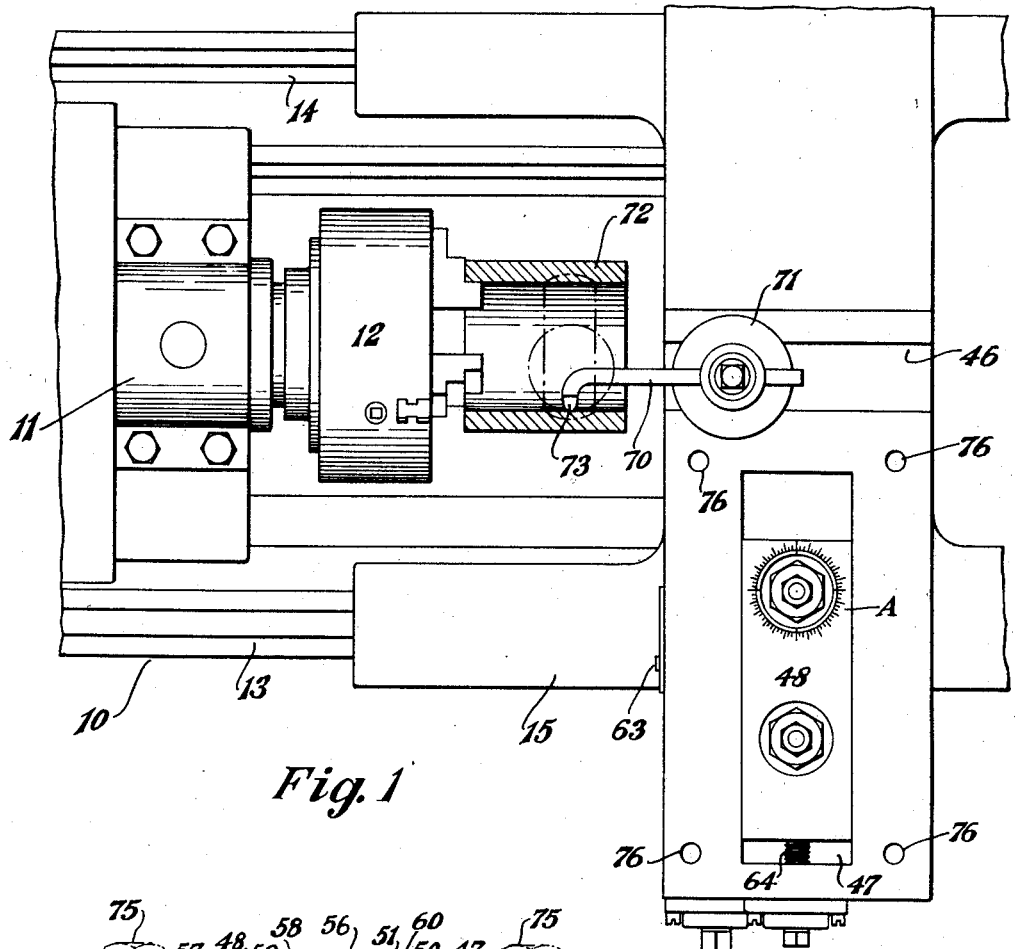
Figure 1 is a fragmentary plan view of a lathe embodying my improved attachment.

An ordinary lathe is indicated generally at 10 in Fig. 1, and includes the head stock 11, in which a chuck 12 may be mounted as shown. The bed of the lathe is provided with dovetail ways 13 and 14 upon which the tool holder carriage 15 is slidable longitudinally of the lathe by operation of the usual hand wheel or screw (not shown).

Figure 4:
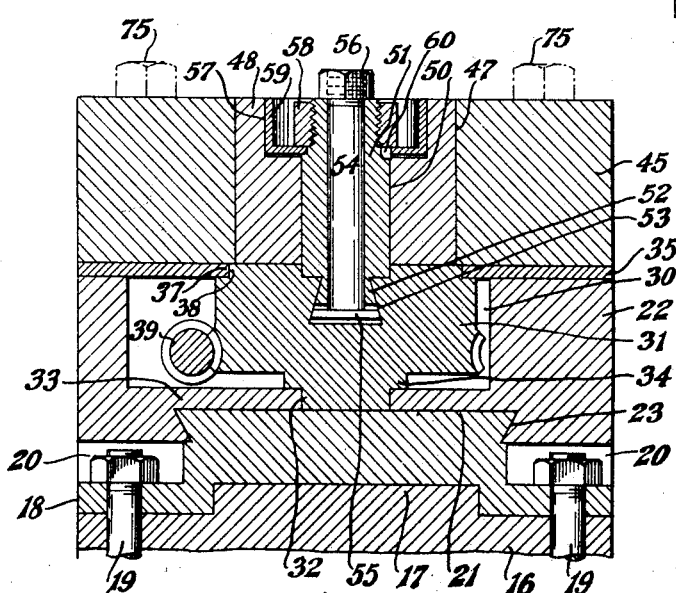
Fig. 4 is a fragmentary sectional view as on line 4—4, Fig. 3.
Figure 2:
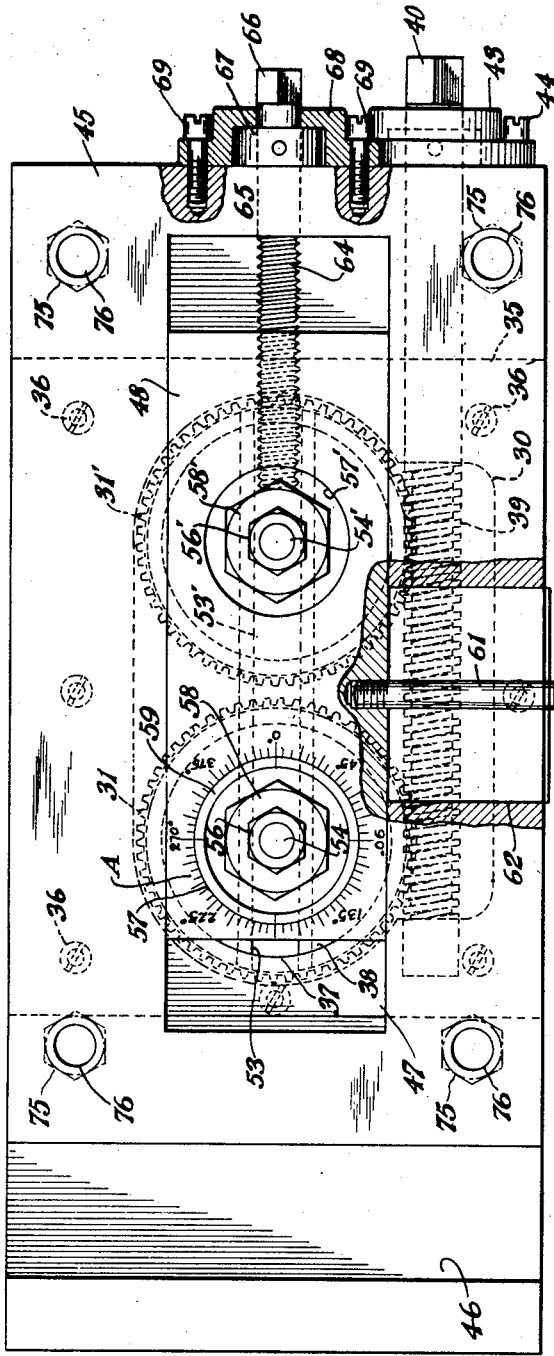
Fig. 2 is an enlarged plan view of the improved attachment.
Figure 3:
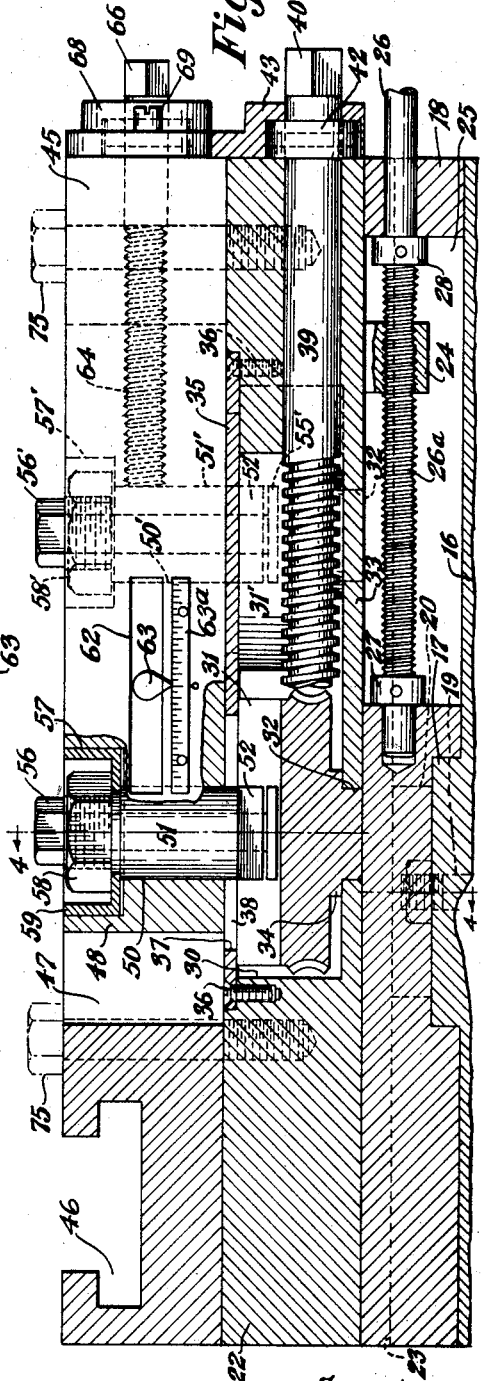
Fig. 3 is a side view thereof partially in section and partially in elevation.

The cross feed plate of the carriage 15 is indicated at 16 in Figs. 3 and 4, and may be provided with a circular boss indicated at 17. The lower plate 18 of my improved lathe attachment is adapted on its underside to fit over the boss 17 so that the boss acts as a pilot around which the plate 18 is rotatable. Normally, the plate 18 is held against rotation relative to the plate 16 by means of bolts 19, which are located at each side laterally of the boss 17, and which are accessible through slots 20 provided at each side of the carriage.

Along its central portion, the plate 18 is provided with an upwardly extending longitudinal dovetail portion 21, and a cross feed intermediate plate 22 is carried on the plate 18 by means of a dovetail groove 23 slidably engaging the dovetail portion 21, whereby the plate 22 is mounted for longitudinal movement on the lower plate 18, that is, cross-wise movement relative to the lathe.

Means for moving the cross feed plate 22 longitudinally on the lower plate 18 preferably includes a lug 24 depending from the plate 22 near its outer end and located on the longitudinal center line of the cross feed carriage. The lug 24 extends into a longitudinal slot 25 formed in the plate 18. A feed screw 26 has its ends journaled in the plate 18, and its intermediate screw threaded portion 26a is screwed through the lug 24. Thrust collars 27 and 28 are located on the screw in position to abut the end walls of the slot 25 and prevent longitudinal movement of the screw when the same is rotated.

The plate 22 is preferably provided in its central portion with side walls and a bottom wall forming an upwardly opening recess 30. A pair of worm gears 31 and 31' is located in the recess 30, and the axis of each gear is located in a vertical plane passing through the longitudinal axis of the carriage. Each of the worm gears 31 and 31' is provided on its underside with a hub portion 32, which is journaled in the bottom wall 33 of the recess 30, and with a shoulder portion 34 which bears against said bottom wall 33.

The top surface of plate 22, is rabbeted around the recess 30 to receive a rectangular plate 35, and allow the top surface of the plate 35 to come flush with the top surface of plate 22. The plate 35 is secured to plate 22 by means of screws 36, and is provided with two circular openings 37 concentric with and slightly smaller than the gears 31 and 31'. These openings are adapted to closely fit around shoulders 38 formed on the upper portions of the gears 31 and 31', for holding the gears in their respective positions in the bottom wall 33 of the recess 30.

A worm 39 is located in the recess 30 along side of and in engagement with both of the gears 31 and 31'. The end portions of the worm 39 are journaled in plate 22 as shown, and the squared outer end 40 of the worm extends beyond the plate for connection with the usual operating handle. Means for preventing longitudinal movement of the worm 39 preferably includes a thrust collar 42 secured to the worm shaft and located against the outer surface of the plate 22, and a retaining plate 43 encircling the worm shaft 39 outside of collar 42 and secured to the plate 22 by means of screws 44. Thus rotation of the worm 39 will rotate the worm gears 31 and 31' in the same direction about their respective axes in the bottom wall 33 of the recess 30.

A tool holder top plate 45 is carried by the plate 22, and it is provided at its inner end with the usual tool holder mounting slot 46. Preferably, the plate 45 is provided with a rectangular slot 47 extending vertically therethrough, the longitudinal axis of the slot being located in the vertical lane passing through the longitudinal axis of the carriage. A block 48 of rectangular cross section, and having a thickness equal to that of the plate 45, fits slidably in the slot 47. The length of the block 48 is considerably less than that of the slot 47, so as to permit longitudinal sliding movement of the block 48 within the slot.

The block 48 is provided along its longitudinal axis with vertically extending cylindrical holes 50 and 50', which are spaced apart a distance equal to the distance between the axes of gears 31 and 31', so that the axes of the holes may be made to coincide with the axes of the gears 31 and 31' respectively. Hollow studs 51 and 51' are journaled in the holes 50 and 50', and provided at their lower ends with dovetail portions 52 and 52', which slidably fit in dovetail grooves 53 and 53' extending diametrically across the gears 31 and 31', so that the studs have a lateral sliding connection with the gears.

Means for locking the studs 51 and 51' in their respective grooves 53 and 53' may include bolts 54 and 54' extending through the studs and having bevelled head portions 55 and 55' on their lower ends for wedgeably engaging the sides of grooves 53 and 53' respectively. Nuts 56 and 56' are provided on the top of bolts 54 and 54' respectively, for drawing the heads 55 and 55' upwardly into engagement with the sides of the grooves 53 and 53' to lock the studs to the gears 31 and 31' respectively.

Sockets 57 and 57' are formed in the block 48 around the upper ends of studs 51 and 51', and relatively large nuts 58 and 58' are screwed on the upper ends of the studs within the sockets. These nuts 58 prevent any appreciable upward movement of the plate 45 relative to plate 22. On stud 51, a cup shaped member 59 fits in the socket 57, and is clamped under nut 58 against a shoulder on the stud, and the cup member 59 is keyed to the stud as shown at 60 in Fig. 4, for a purpose to be later described. A slight clearance is provided between the bottom of member 59 and socket 57, and between the bottom of nut 58' and the bottom of socket 57' so as to permit easy rotation of the studs in the block 48 and at the same time limit the upward movement of the block.

Means for indicating the positions of studs 51 and 51' relative to the axes of gears 31 and 31' respectively, may include an indicator rod 61 extending through a slot 62 provided in one side of plate 45, the inner end of the rod being secured to the block 48 as shown, and the outer end having a pointer 63 thereon. Preferably, the pointer 63 is adapted to cooperate with a scale 63a secured to the side wall of plate 45 adjacent the slot 62. When the studs 51 and 51' are located in coincidence with the axes of the gears 31 and 31' respectively, the pointer 63 will read zero on the scale, and the operation of screw 39 will rotate the gears 31 and 31', and their studs 51 and 51' will turn in the block 48 without moving the block 48 or the tool holder plate 45.

Means for moving the block 48 longitudinally in the slot 47 for adjusting the eccentricity of the studs 51 and 51' relative to the gears 31 and 31' and thus varying the radius of the circular path traversed by the plate 45, preferably includes a screw 64 preferably located on the axis of the block 48, and journaled through the outer end wall 65 of plate 45. The screw 64 is threaded into block 48, and the outer squared end 66 of the screw extends beyond the end wall 65 for connection with an operating handle (not shown). Means for preventing longitudinal movement of the screw 64 preferably includes a collar 67 secured on the screw 64 adjacent the outer surface of plate 45, and a retaining plate 68 encircling the screw outside of the collar 67 and secured to plate 45 as by screws 69.

In making an arcuate cut with the improved attachment, the operation is as follows:

Assuming the parts to be in the positions shown in the drawings with the pointer 63 reading zero on the scale 63a, the nuts 56 and 56' are first loosened to unlock the studs 51 and 51' from wedging engagement with the grooves 53 and 53' of the gears 31 and 31' respectively.

The screw 64 is then rotated to move the block 48 longitudinally in slot 47 until the reading on the scale 63a corresponds with the radius of the arcuate cut desired to be made. The nuts 56 and 56' are then tightened to lock the studs in this off center or eccentric position relative to the axes of the gears 31 and 31'. The tool 70 such as is shown mounted in tool holder 71 in Fig. 1 is then brought into close proximity to the face of work 72 by manipulation of the longitudinal carriage feed and the cross feeds in the usual manner, so that the nose 73 of the tool occupies the desired position to initiate the making of the arcuate cut. The worm 39 is then operated to rotate gears 31 and 31', whereupon the plate 45, block 48 and tool holder 71 will all move in a circular path the radius of which is equal to the reading on the scale, and the nose of the tool will follow a path such as is indicated in dot-dash lines in Fig. 1.

The arcuate cut thus performed is always accurate, since the skill of the operator does not enter into the operation. Obviously, by using the cross feeds of the carriage, and by rotating the lower plate 18 on the plate 16 as previously described, practically any desired arcuate cut may be performed upon a variety of work.

Preferably, the upper surface of block 48 at the edge of socket 57 is graduated to form a vernier as shown at A, and the upper edge of the cup 59 is marked for cooperation therewith. When the diametric grooves 53 and 53' of the gears 31 and 31' respectively, are in alinement, which position is necessary in order to shift the studs 51 and 51' therein for changing their eccentricity, the vernier A will read zero. By means of this vernier it is always possible to see the amount of rotation of the studs relative to the block, that is, what proportion of its complete circular path has been traversed by the block 48 or tool 70 for any reading on the scale 63a.

This arrangement is of great value in enabling the operator to ascertain in what part of its path the nose of the tool is located when the arcuate cut is initiated. For instance, if it is desired to make an arcuate cut at an angle to the axis of the work, the worm 39 is operated until the corresponding angle is shown on the vernier A, at which time the carriage feeds are operated to initiate the cut.

Or, for instance, if it is required to make an arcuate cut upon an inner hidden surface, and the travel of the tool is restricted to narrow limits by adjacent surfaces of the work, the vernier A will indicate those limits to the operator, as the cut is performed.

When it is desired to use my improved attachment for ordinary straight work, all that is necessary is to insert the screws 75 (shown in dot-dash lines) into holes 76 in the plate 45, for securing the plates 45 and 22 together. The improved attachment will then function in the same manner as an ordinary lathe compound.

I claim:

1. A lathe attachment for making arcuate cuts including a cross feed plate, a top tool holder plate carried thereon, a pair of worm gears journaled in the cross feed plate, a worm meshing with both gears, a block slidable in the top plate, studs journaled in said block and having a lateral sliding connection with the gears, and means for sliding said block in the top plate to move the studs laterally relative to the gears.

2. A lathe attachment for making arcuate cuts, including a cross feed plate, a top tool holder plate carried thereon, a pair of worm gears journaled in the cross feed plate, a worm meshing with both gears, a block slidable in the top plate, studs journaled in said block and having a lateral sliding connection with the gears, means for sliding said block in the top plate to move the studs laterally relative to the gears, and wedge means for locking said studs to said gears.

3. A lathe attachment for making arcuate cuts including a cross feed plate, a top tool holder plate carried thereon, spaced rotary members journaled in said cross feed plate and having diametrically extending grooves in their upper surfaces, means for simultaneously rotating the rotary members, a block slidable in the top plate, studs journaled in the block and having heads slidably inserted in said grooves, means for sliding the block in the top plate to move the studs laterally in the grooves, and means on each stud for locking the studs in their respective grooves.

4. In a lathe attachment for making arcuate cuts, a lower plate and an upper tool holder plate, means for moving the upper plate in a horizontal circular path relative to the lower plate and for adjusting the radius of said path, said means comprising a block slidable in the upper plate, a pair of studs journaled in the block, a pair of gears journaled in the lower plate and provided with diametrically extending grooves, means for simultaneously rotating the gears, the studs having a dovetailed connection with said grooves, means for sliding the block in the upper plate to slide the studs in the grooves laterally of the gears, and means for indicating the proportion of the circular path traversed by the tool holder plate at any time.

5. In a lathe attachment for making arcuate cuts, a lower plate and an upper tool holder plate, means for moving the upper plate in a horizontal circular path relative to the lower plate and for adjusting the radius of said path, said means comprising a block slidable in the upper plate, a pair of studs journaled in the block, a pair of gears journaled in the lower plate and provided with diametrically extending grooves, means for simultaneously rotating the gears, the studs having a dovetailed connection with said grooves, means for sliding the block in the upper plate to slide the studs in the grooves laterally of the gears, and wedge means for locking the studs in their respective grooves.

6. A lathe attachment for making arcuate cuts including a cross feed plate provided with a recess, a top tool holder plate carried thereon, a pair of worm gears journaled in the cross feed plate within said recess, a worm meshing with both gears, a block slidable in the top plate, studs journaled in said block and having a lateral sliding connection with the gears, and means for sliding said block in the top plate to move the studs laterally relative to the gears.

7. A lathe attachment for making arcuate cuts including a cross feed plate, the cross feed plate having side walls and a bottom wall forming an upwardly opening recess therein, a top tool holder plate carried on the cross feed plate, a pair of worm gears located within the recess and journaled in the bottom wall thereof, a worm meshing with the gears, a block slidable in the top plate, studs journaled in said block and having a lateral sliding connection with the gears, and means for sliding said block in the top plate to move the studs laterally relative to the gears.

8. A lathe attachment for making arcuate cuts including a cross feed plate, the cross feed plate having side walls and a bottom wall forming an upwardly opening recess therein, a top tool holder plate carried on the cross feed plate, a pair of worm gears located within the recess and journaled in the bottom wall thereof, a worm extending through the recess and meshing with both gears, means for maintaining the gears in position in the recess, a block slidable in the top plate, studs journaled in said block and having a lateral sliding connection with the gears, and means for sliding said block in the top plate to move the studs laterally relative to the gears.

9. A lathe attachment for making arcuate cuts including a cross feed plate, a top tool holder plate carried thereon, a pair of worm gears journaled in the cross feed plate, a worm meshing with the gears, a block slidable in the top plate, studs journaled in said block and having a lateral sliding connection with the gears, means on one of the studs indicating the amount of rotation thereof relative to the block, and means for sliding said block in said top plate to move the studs laterally relative to the gears.

10. A lathe attachment for making arcuate cuts including a cross feed plate, a top tool holder plate carried thereon, a pair of worm gears journaled in the cross feed plate, a worm meshing with the gears, a block slidable in the top plate, studs journaled in said block and having a lateral sliding connection with the gears, the block being provided with a vernier scale around one of the studs, a member secured to said stud and provided with a cooperating vernier scale indicating the amount of rotation of the studs relative to the block, and means for sliding said block in said top plate to move the studs laterally relative to the gears.

11. A lathe tool holder attachment for making straight and arcuate cuts including a cross feed plate, a top tool holder plate carried thereon, spaced rotary members journaled in said cross feed plate and having diametrically extending grooves in their upper surfaces, means for simultaneously rotating the rotary members, a block slidable in the top plate, studs journaled in the block and having heads slidably inserted in said grooves, and means for sliding said block in the top plate to move the studs laterally in the grooves, the top plate and the cross feed plate each being provided with bolt holes adapted to register with each other when the grooves are in alignment, for receiving bolts to secure said plates together.

PAUL P. FEIT.